June 24, 1930.  C. D. STEWART  1,765,635
BRAKE VALVE DEVICE
Filed Oct. 18, 1928
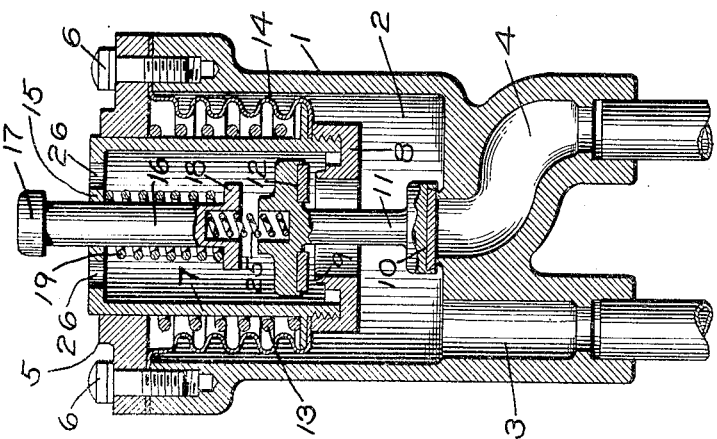
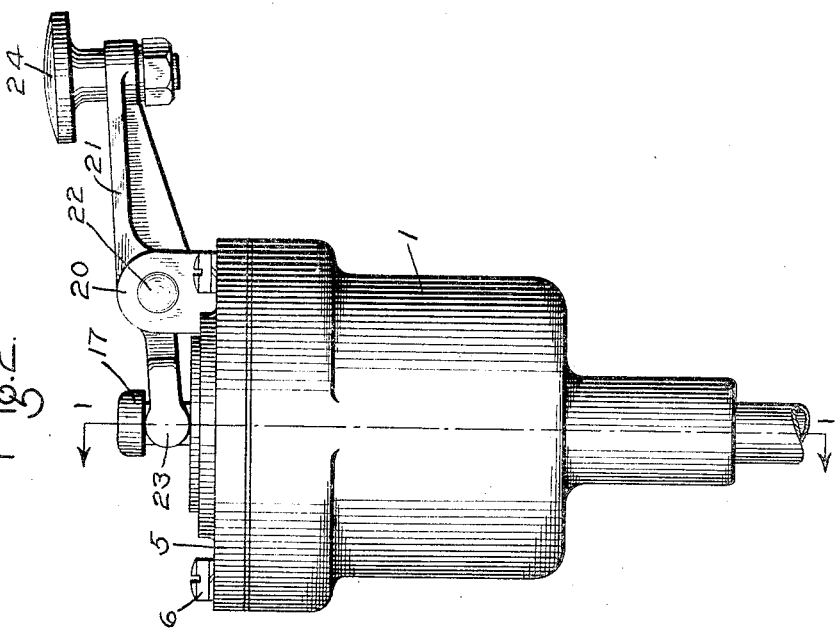
INVENTOR
CARLTON D. STEWART
BY *Wm. M. Cody*
ATTORNEY Patented June 24, 1930

1,765,635

UNITED STATES PATENT OFFICE

CARLTON D. STEWART, OF BERKELEY, CALIFORNIA, ASSIGNOR TO THE WESTING-HOUSE AIR BRAKE COMPANY, OF WILMERDING, PENNSYLVANIA, A CORPORATION OF PENNSYLVANIA

BRAKE-VALVE DEVICE

Application filed October 18, 1928. Serial No. 313,297.

This invention relates to brake controlling valves, and more particularly to a controlling valve device for an automotive brake of the vacuum type.

The principal object of my invention is to provide a simple device of the above character, of few parts, and which can be cheaply manufactured.

In the accompanying drawing; Fig. 1 is a central sectional view on line 1—1 of Fig. 2 of a brake controlling valve device embodying my invention; and Fig. 2 an elevational view of the brake valve device shown in Fig. 1.

The valve device may comprise a substantially cylindrical casing 1 having a chamber 2 with which communicates a passage 3, leading to the usual brake cylinder (not shown), and a passage 4, leading to a vacuum source.

The upper end of the casing 1 is covered by a plate 5 secured to the casing by bolts 6 and having a central opening adapted to receive a movable cylindrical member 7. Having threaded connection with the lower end of the member 7 is a seat member 8 having a seat rib 9. A valve 10 controls communication from passage 4 to chamber 2, and said valve has a stem 11 carrying at its upper end a valve 12 which is adapted to engage the seat rib 9.

A coil spring 13 surrounds the member 7 and is interposed between the shoulder of the member 8 and the cap plate 5. A syphon tube 14 provides a fluid-tight connection between the member 7 and the casing 1, so that the member 7 is movable by differences in fluid pressure acting on opposite sides thereof.

Extending through a central opening in the upper end wall 15 of the member 7 is a stem 16 having a head 17 at its upper end and a head 18 at its lower end. A coil spring 19 surrounds said stem and is interposed between the head 18 and the end wall 15.

Carried by the cover plate 5 are lugs 20 between which a lever 21 is mounted on a pivot pin 22. One end of the lever is provided with forked fingers 23 which are adapted to engage the under face of the head 17. The other end of the lever has secured thereto a push button 24, which is preferably adapted to be operated by the foot of the operator. A light coil spring 25 is interposed between the valve 12 and the stem 16, the ends of the spring being disposed in sockets provided in the valve 12 and in the stem 16.

When no pressure is applied to the push button 24, the spring 13 acts to hold the member 7 in the position shown, the parts being so disposed that the valve 10 is seated, while the valve 12 is held away from the seat rib 9. Chamber 2 and consequently the passage 3 and the brake cylinder are now open to the atmosphere, past the unseated valve 12 and through the atmospheric openings 26, so that the brakes are released.

If it is desired to apply the brakes, the push button 24 is depressed and thereby the lever 21 is operated to cause an upward movement of the stem 16 by engagement of the fingers 23 with the head 17. The upward movement of the stem 16 acts through the spring 19 to move the member 7 upwardly against the resistance of spring 13, and this upward movement first causes the seat rib 9 to engage the valve 12, and then the valve 12 is moved with the member 7, so as to unseat the valve 10. The valve 10 being unseated, the passage 4 is connected to chamber 2 and air is exhausted from said chamber and from the brake cylinder connected to passage 3 by flow to passage 4, which is connected to a vacuum creating source. The brakes are applied to the extent of the partial vacuum created in the brake cylinder, and when the pressure in chamber 2 has been thus reduced to such an extent that the atmospheric pressure acting on the member 7 above the valve 12, plus the pressure of spring 13, is sufficient to overcome the pressure of spring 19, the member 7 will be moved downwardly until the valve 10 seats.

If it is desired to apply the brakes with greater force, the pressure applied to the push button 24 is increased and the member 7 is again moved upwardly so as to unseat the valve 10. The partial vacuum in the brake cylinder is thus increased and the member 7 again operates to seat the valve 10, when the vacuum created in chamber 2 has reached a degree sufficient to permit the movement of member 7 in the manner hereinbefore described.

The brakes are released by relieving the pressure on the button 24, so that the member 7 is free to move downwardly under the pressure of spring 13, and thereby cause the seat rib 9 to move away from the valve 12. Air at atmospheric pressure then enters the chamber 2 and flows to the brake cylinder through passage 3, so that the brakes are released.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A brake valve device for automotive brakes comprising a casing, a movable abutment mounted in said casing and subject to the opposing pressures of the atmosphere and a chamber, a valve for controlling communication from a vacuum creating source to said chamber, a valve connected to the first valve and controlling communication from said chamber to the atmosphere, said release valve being adapted to seat on said abutment upon movement of the abutment, and manually operable means for moving said abutment.

2. A brake valve device for automotive brakes comprising a casing, a movable abutment mounted in said casing and subject to the opposing pressures of the atmosphere and a chamber, a syphon tube connected to said abutment and separating said chamber from the atmosphere, and valves operated by said abutment for controlling the connection of a vacuum creating source to said chamber and the connection of said chamber with the atmosphere.

3. A brake valve device for automotive brakes comprising a casing having a chamber, a valve for controlling commnication from a vacuum source to said chamber, a valve for controlling communication from said chamber to the atmosphere, a stem connecting said valves, a movable member having a seat for engaging the atmospheric valve upon movement of said member, a spring urging said member away from said atmospheric valve, a stem for operating said member, a spring interposed between said member and said stem, and manually operated means for operating said stem.

4. A brake valve device for automotive brakes comprising a casing having a chamber, a valve for controlling communication from a vacuum source to said chamber, a valve for controlling communication from said chamber to the atmosphere, a stem connecting said valves, a movable member having a seat for engaging the atmospheric valve upon movement of said member, a spring urging said member away from said atmospheric valve, a stem for operating said member, a spring interposed between said member and said stem, a head carried by said stem, a lever mounted on said casing and operatively connected to said stem, and a manually operable member for operating said lever.

In testimony whereof I have hereunto set my hand, this 8th day of October, 1928.

CARLTON D. STEWART.